United States Patent
Mizukami et al.

[11] Patent Number: 5,722,524
[45] Date of Patent: Mar. 3, 1998

[54] DRY MULTI-DISK CLUTCH

[75] Inventors: Hiroshi Mizukami, Neyagawa; Yoshinobu Fukuda, Higashiosaka, both of Japan

[73] Assignee: Exedy Corporation, Osaka, Japan

[21] Appl. No.: 764,436

[22] Filed: Dec. 12, 1996

Related U.S. Application Data

[63] Continuation-in-part of Ser. No. 438,726, May 10, 1995, Pat. No. 5,638,932.

[30] Foreign Application Priority Data

Jul. 17, 1996 [JP] Japan .................... 8-187498

[51] Int. Cl.$^6$ .................................................. F16D 13/72
[52] U.S. Cl. ................ 192/70.12; 192/113.22; 192/113.23
[58] Field of Search ............... 192/70.12, 70.14, 192/70.2, 89.23, 113.2, 113.22, 113.23, 113.24, 113.26, 113.3, 113.34, 113.36

[56] References Cited

U.S. PATENT DOCUMENTS

| | | | |
|---|---|---|---|
| 1,742,804 | 1/1930 | Carhart | 192/70.12 X |
| 2,976,975 | 3/1961 | Thostenson et al. | 192/70.12 |
| 4,313,533 | 2/1982 | Aschauer | 192/113.34 |
| 4,396,100 | 8/1983 | Eltze | 192/70.12 |
| 4,473,144 | 9/1984 | Allori | 192/70.12 |
| 4,633,990 | 1/1987 | Fukutake et al. | 192/89.23 X |
| 5,301,779 | 4/1994 | Nash | 192/70.2 |

FOREIGN PATENT DOCUMENTS

| | | | |
|---|---|---|---|
| 2-134447 | 5/1990 | Japan | 192/113.34 |
| 4-25623 | 1/1992 | Japan | 192/113.34 |
| 5-141446 | 6/1993 | Japan | 192/113.34 |
| 5-231446 | 9/1993 | Japan | 192/113.34 |

*Primary Examiner*—Richard M. Lorence
*Attorney, Agent, or Firm*—Shinjyu Office of Patent Attorneys Osaka Japan

[57] ABSTRACT

A clutch cover assembly 10 is used with clutch friction disks of a dry multi-disk clutch 1, and is provided with a diaphragm spring 30, a clutch cover 28 and a support structure 31. The outer periphery portion of the diaphragm spring 30 loads the clutch friction disks. The support structure 31 includes a first annular disk-like ring member 35 possessing a first ring main body 38 which contacts a portion of the diaphragm spring 30 from the clutch cover 28 side and a seating portion 40 which extends from the first ring main body 38 and seats against the clutch cover 28, a second annular disk-like ring member 36 possessing a second ring main body which contacts the diaphragm spring 30 on the side opposite the first annular disk-like ring member 35, and bolts 37 for fixing the first and second annular disk-like annular disk-like ring members 35 and 36 to the clutch cover 28. One purpose of the invention is to suppress clutch cover wear caused by annular disk-like annular disk-like wire ring members. A hub flange 6 having a boss 11 and a flange 12 extending from the boss 11 to the outer periphery where a drum-shaped element 13 is formed that extends axially to opposite sides of the outer periphery of the flange 12. Plural annular drive plates 7 and plural annular driven plates 8 are disposed between a flywheel and the clutch cover 28. In the flange 12 passage openings 14 are formed which provide air flow. In the two axially projecting portions of the second drum-shaped element 13, there are formed air passage holes 19 and 20, the openings and holes preventing the temperature in friction disks in a dry multi-disk clutch from rising excessively.

24 Claims, 14 Drawing Sheets

5,722,524

DRY MULTI-DISK CLUTCH

This application is a continuation-in-part of application Ser. No. 08/438,726, filed May 10, 1995, now U.S. Pat. No. 5,638,932.

BACKGROUND OF THE INVENTION

1. Field Of The Invention

The present invention relates to a dry multi-disk clutch assembly for use in a motorized vehicle. More particularly, the present invention relates to a multi-disk clutch having a plurality of clutch disk elements disposed within a cylindric drum shaped member and having limited axial movement relative thereto. The cylindric drum shaped member and other clutch elements are formed with air holes to prevent excessive heating and diaphragm spring engaging portions to reduce wear.

2. Description Of The Related Art

Clutch mechanisms having multiple clutch disks are well known. Clutch mechanisms typically include a clutch cover assembly whose outer periphery portion is fixed to a flywheel, an annular pressure plate provided inside the clutch cover, a diaphragm spring which, by its resilient force, urges the pressure plate towards multiple clutch friction disks sandwiched therebetween, and a support structure within the clutch cover to support the diaphragm spring.

Generally, dry multi-disk clutch assemblies are often used for automotive racing applications. As such, a bud flange is disposed between the flywheel and the pressure plate, the hub flange having a hub connected to a transmission shaft, a flange that extends from the hub to the outer periphery, and a drum-shaped element that is provided on the outer periphery of the flange and projects to opposite sides of the flange, the clutch friction disks being located in the space between this drum-shaped element and an outer flywheel ring which encircles and encloses the multiple clutch disks. One end of the space in which the friction disks are installed faces a surface such as that of the flywheel, etc. against which the friction disks are pressed, and the other end faces the pressure plate.

The support structure generally includes a ring element that engages one surface of the diaphragm spring, and bolts which fix the ring element to the clutch cover, thus retaining the diaphragm spring therebetween. The ring element engages an inner surface of the clutch cover. Projections or leg members at plural locations are fixed to the clutch cover by bolts.

The diaphragm spring deforms in response to the clutch engagement action and disengagement action and exerts pressure in various directions on the ring element. In response to this, the ring element tries to move with respect to the clutch cover.

In a conventional structure, the ring element is literally a ring possessing a cross-section with an approximately circular shape, and its area of contact with the clutch cover is small. Consequently the contact pressure between the ring element and the clutch cover is large.

As a result, great wear occurs in the clutch cover portions that contact the ring element. One reason why the clutch cover becomes worn is that the ring element is typically made of steel, whereas the clutch cover, in order to reduce weight, is typically made of metal consisting mainly of aluminum.

The occurrence of wear in the clutch cover results in slippage of the ring element position, and consequently in distortion of the diaphragm spring's operating characteristics. Also, if its wear progresses to a considerable extent, the clutch cover has to be replaced.

With the above structure, the inner periphery and outer periphery of the friction disk installation space are enclosed by the drum-shaped element at the hub flange's outer periphery and the flywheel ring, and at opposite axial ends are enclosed by the flywheel and by the pressure plate and the clutch cover. With this structure, there is only limited air flow. Air may only flow from outside into the area of the clutch disks through a narrow gap that is between the pressure plate and a hub flange outer periphery end portion and go as far as the surfaces of the friction disks that are near this gap. It is therefore not possible to cool the friction disks effectively, and, in particular, the cooling effects for friction disks that are not adjacent to the pressure plate are extremely poor. As a result, the friction disks become overheated. Overheating of friction disks can cause serious problems relating to their operating characteristics and durability.

The multiple clutch disks usually include alternating driven and drive plates, the drive plates engaging the flywheel ring (which rotates with the flywheel) and the driven plates which rotate with the transmission shaft. The range of axial displacement of the drive plates and driven plates is restricted by the flywheel and the pressure plate. The axial position of the hub flange is kept within a set range by a protrusion or pin that may disposed in the hub flange, the pin or protrusion being attached to an outer radial surface of the hub flange and extending radially between two adjacent the drive plates.

There are two possible problems associated with the positioning pin. First, the pin may effect the moment of inertia of the overall flywheel mechanism and of the hub. Second, if the pin is disposed in a hole formed in the flange hub, there is a possibility of the pin coming out of the hole of the due to heat or vibration produced at the time of clutch coupling.

SUMMARY OF THE INVENTION

One object of the present invention is to improve the heat dissipation characteristics of a clutch mechanism.

In accordance with one aspect of the present invention, a clutch assembly includes a hub member having a central hub which is connectable to a transmission shaft, the hub member having a drum-shaped element and a flange portion which extends radially outward from the central hub to the drum-shaped element, the drum-shaped element formed with a plurality of gear teeth. At least one of the gear teeth has an axially extending hole extending therethrough and a radially extending opening extending from the axially extending hole to a radial outward portion of the one of the gear teeth.

Preferably, each of the gear teeth are formed with the axially extending hole and the radially extending opening.

Preferably, the radially extending opening is a hole extending from the radially outward portion of the one of the gear teeth to the axially extending hole.

Preferably, the radially extending opening is a circumferentially extending groove formed in the one of the gear teeth and open to the axially extending hole.

Preferably, the clutch assembly further includes a cylindric drum-shaped element connectable to a flywheel. The cylindric drum-shaped element is formed with a plurality of elongated air passages which extend in a circumferential direction on an outer surface thereof, the hub member disposed within the cylindric drum-shaped element. A plurality of clutch drive plates and a plurality of clutch driven plates are disposed in axially alternating layers between the cylindric drum-shaped element and the drum-shaped element, the clutch drive plates having outer periphery portions contacting an inner peripheral surface of the cylindric drum-shaped element for rotation therewith, and for axial movement relative thereto, inner periphery portions of the clutch driven plates contacting an outer peripheral surface of the drum-shaped element for rotation therewith, and for relative axial movement with respect thereto, the clutch driven plates formed with radially extending grooves which allow for passage of air. A clutch cover mechanism is also provided for selective engagement and dis-engagement of the clutch drive plates with the clutch driven plate.

Preferably, the clutch driven plates are formed with gaps proximate the radially extending openings.

In another aspect of the present invention, a clutch assembly includes a first cylindric drum-shaped element connectable to a flywheel and a hub member having a central hub which is connectable to a transmission shaft. The hub member is formed with a second drum-shaped element and a flange portion which extends radially outward from the central hub to the second drum-shaped element, the hub member disposed within the first cylindric drum-shaped element, the second drum shaped element formed with a plurality of gear teeth, at least one of the gear teeth having axially extending hole extending therethrough and a radially extending opening extending from the axially extending hole to a radial outward portion of the one of the gear teeth. A plurality of clutch drive plates and a plurality of clutch driven plates are disposed in axially alternating layers between the first cylindric drum-shaped element and the second drum-shaped element, the clutch drive plates having outer periphery portions contacting an inner peripheral surface of the first cylindric drum-shaped element for rotation therewith, and for axial movement relative thereto. Inner periphery portions of the clutch driven plates contact an outer peripheral surface of the second drum-shaped element for rotation therewith, and for relative axial movement with respect thereto. Further, a clutch cover mechanism is provided for selective engagement and dis-engagement of the clutch drive plates with the clutch driven plates.

Preferably, each of the gear teeth are formed with the axially extending hole and the radially extending opening.

Preferably, the radially extending opening is a hole extending from the radially outward portion of the one of the gear teeth to the axially extending hole.

Preferably, the radially extending opening is a circumferentially extending groove formed in the one of the gear teeth and open to the axially extending hole.

Preferably, the first cylindric drum-shaped element being formed with radially extending air passages which provide communication between inside and outside the first cylindric drum-shaped element.

Preferably, the air passages are elongated slits extending in the circumferential direction.

Preferably, the drive plates and the driven plates are formed with radially extending grooves on one surface thereof.

Preferably, the hub member, the second drum shaped element and the flange portion are integrally formed.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENTS

Figure 1:
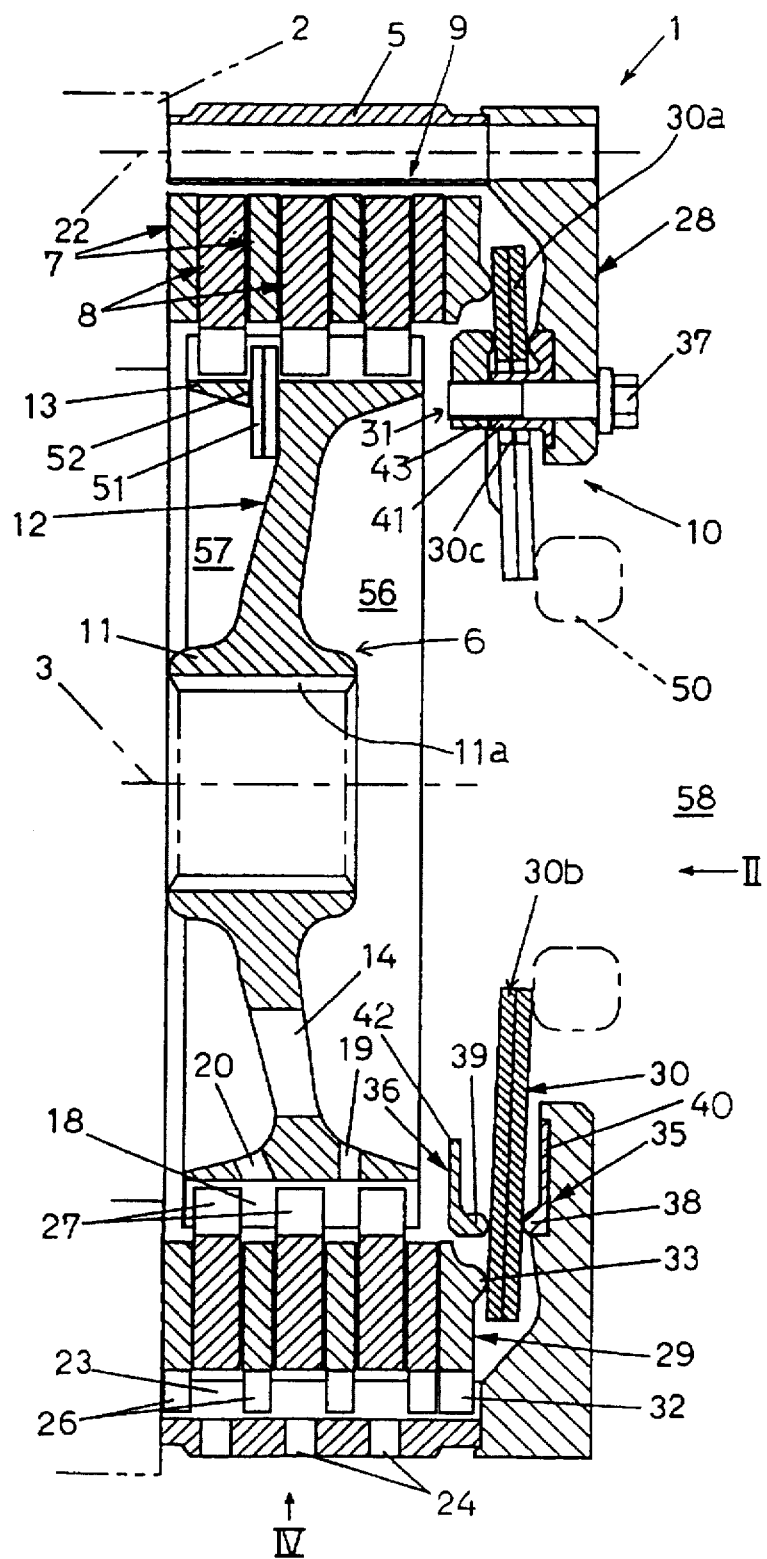
FIG. 1 is a cross-sectional view of a dry multi-disk clutch for an automobile in accordance with a first embodiment of the present invention.
Figure 2:
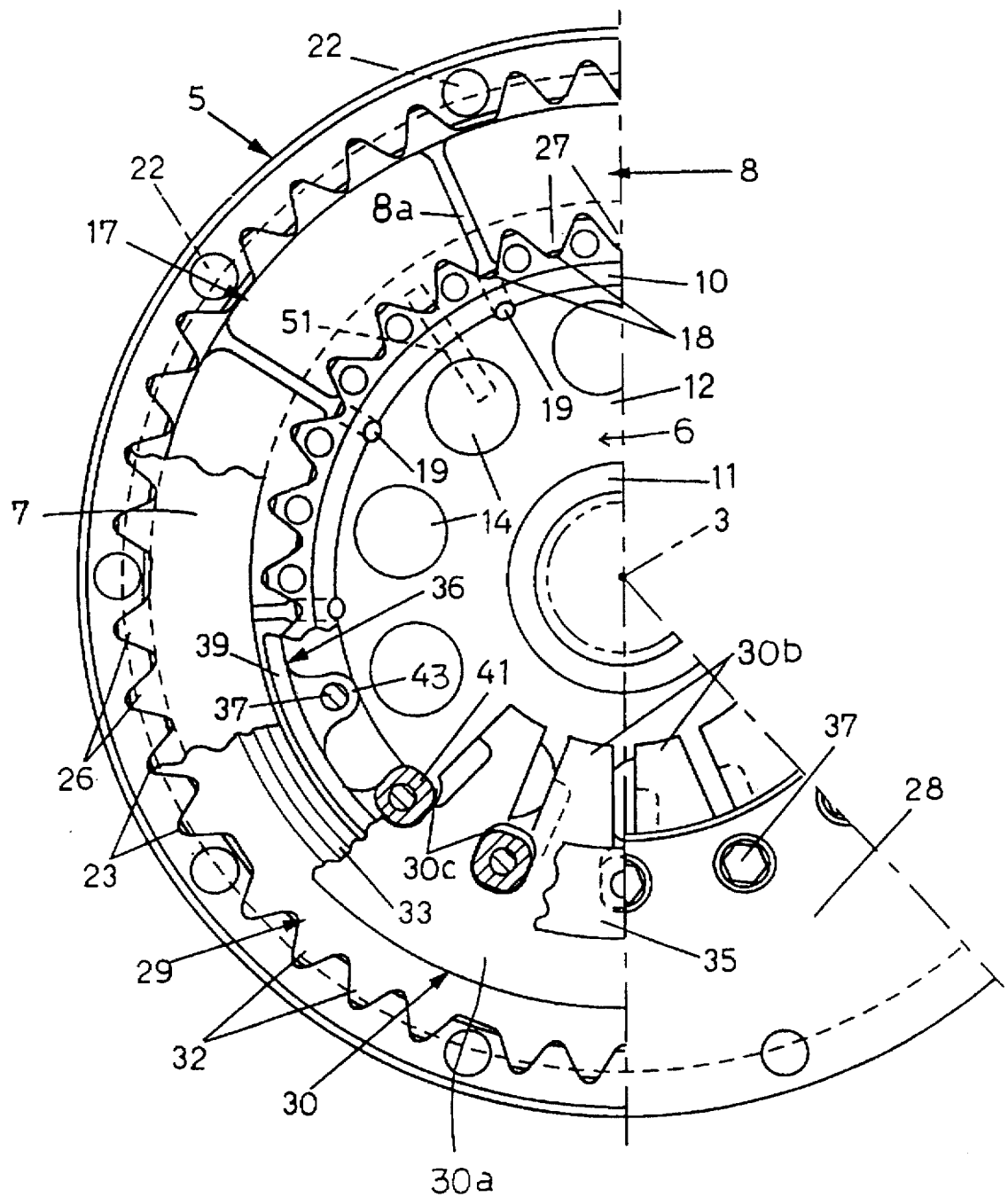
FIG. 2 is a fragmentary, part cut-away view of a portion of the dry multi-disk clutch depicted in FIG. 1, looking in the direction of the arrow II in FIG. 1.

FIG. 1 is a cross-section of a dry multi-disk clutch 1 for an automobile in a first embodiment of the present invention, and FIG. 2 is a view, partially cut-away, of the portion of FIG. 1 looking in the direction of the arrow II. The dry multi-disk clutch i is a device for engagement and dis-engagement of transmission of torque from the flywheel 2 of an engine (not shown) to a transmission input shaft of which only the center line 3 is shown in the drawings. Herein after, the transmission input shaft will be referred to as input shaft 3 having a center line. The main elements with which the dry multi-disk clutch 1 is provided are: a flywheel ring 5, which is a first drum-shaped element and which also serves as an input element; a hub flange 6, which serves as an output element; friction disk group 9 that is disposed between the flywheel ring 5 and the hub flange 6 and includes a plurality of drive plates 7 and a plurality of driven plates 8; and a clutch cover assembly 10 for establishing pressure contact between the pairs of plates 7 and 8 and for disengaging contact between the plates 7 and 8.

The hub flange 6 is formed with a boss 11 located at its center, a flange 12 that integrally extends from the boss 11 to the outer periphery side, and a second drum-shaped element 13 that is integrally provided at the outer periphery of the flange 12. A spline hole 11a in the center of the boss 11 engages with spline teeth on the transmission input shaft 3, whereby the hub flange 6 is free to move axially with respect to the transmission input shaft 3. Plural air passage openings 14 are formed at intervals around the circumference of the flange 12 of the hub flange 6.

As is shown in FIG. 1, the air passage openings 14 provide communication between the clutch internal spaces 56 and 57 on opposite sides of the flange 12. The second drum-shaped element 13 extends axially from the either side of the flange 12. Axially extending external teeth or grooves 18 are formed on the outer periphery of the second drum-shaped element 13, as is shown in FIG. 2. In other words, the second drum-shaped element 13 is provided, at intervals around the circumference, with a large number of axially extending engagement grooves 18. Plural air passage holes 19 and 20 are provided in respective axially projecting portions on opposite sides of the second drum-shaped element 13, as is shown in FIG. 1. The air passage holes 19 and 20 all pass approximately radially through the second drum-shaped element 13, and their end portions at the outer side in the radial direction open into the bottom portions of the engagement grooves 18. As shown in FIG. 2, the air passage holes 19 are provided at plural locations at intervals around the circumference of the second drum-shaped element 13.

The flywheel ring 5 is concentrically installed radially outside the second drum-shaped element 13, and its left-hand end portion, as seen in FIG. 1, is fixed by plural bolts 22 (indicated only by a center line) to the engine's flywheel 2. The flywheel ring 5 is provided with internal teeth, or, to put it another way, it is provided with a large number of axially extending engagement grooves 23 at intervals around the circumference, as is shown in FIG. 2.

Figure 4:
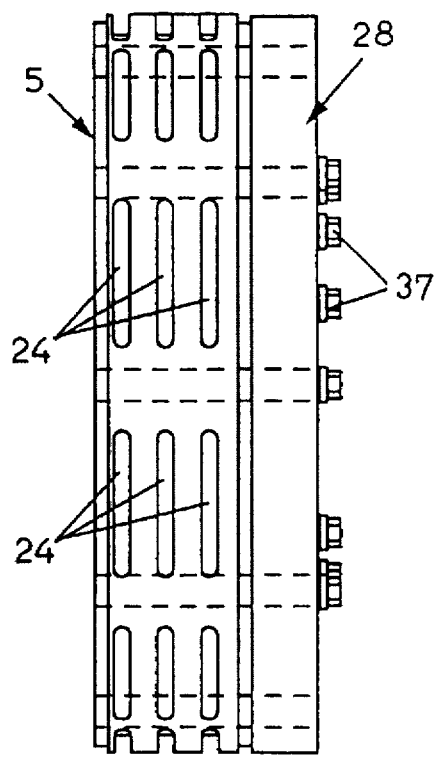
FIG. 4 is a side elevation of the dry multi-disk clutch depicted in FIG. 1 looking in the direction of the arrow IV in FIG. 1.

FIG. 4 is a view looking in the direction of the arrow IV of FIG. 1. As shown in FIG. 1 and FIG. 4, a plurality of air passage grooves 24 are formed at various plural locations in the outer peripheral surface of the flywheel ring 5. As shown in FIG. 1 the air passage grooves 24 are provided at the outer side, going radially, of the driven plates 8. As is clear from FIG. 4, the air passage grooves 24 are provided at respective locations at intervals going in the direction of the flywheel ring 5 axis (i.e., on one and the same circumference) and at plural locations at intervals around the circumference. Each air passage groove 24 extends in an arc shape following the direction of the circumference of the flywheel ring 5 and its bottom portion opens at the bottom surface of plural engagement grooves 23. In other words, each individual air passage groove 24 opens at the outer peripheral surface of the flywheel ring 5 and it communicates with the bottom spaces of plural engagement grooves 23. Because of the provision of the air passage grooves 24 extending in the circumferential direction, the flywheel ring 5 is made lighter.

The friction disk group 9 is provided between the inner side of the flywheel ring 5 and the second drum-shaped element 13 of the hub flange 6. In the axial direction, the friction disk group 9 is located between the friction surface of the flywheel 2 and an annular pressure plate 29 (described in greater detail below).

The friction disk group 9 includes four drive plates 7 and three driven plates 8 arranged in alternating layers in the axial direction. The drive plates 7 and driven plates 8 are dry, annular friction disks, and they are all installed concentrically with the transmission input shaft 3. The drive plates 7 have radially extending projections 26 formed on their outer periphery portions, and these projections 26 engage the engagement grooves 23 of the flywheel ring 5 in a manner such that they are free to slide axially but relative rotation is restricted by the engagement of the projections 26 in the grooves 23. A plurality of radiating shallow grooves 8a are provided in the outer surfaces of the driven plates 8. Each groove 8a extends from the inner periphery to the outer periphery of a driven plate 8, and is so located that it is generally aligned on a straight line with air passage holes 19 and 20.

The clutch cover assembly 10 includes a clutch cover 28, an annular pressure plate 29 that is provided inside the clutch cover 28, a diaphragm spring 30 for urging the pressure plate 29 in the direction of the flywheel 2, and a support structure 31 that supports the diaphragm spring 30 in the clutch cover 28.

The clutch cover 28 is fixed to the end surface of the flywheel ring 5 by the above mentioned bolts 22. The weight of the clutch cover 28 may be reduced by making it of a relatively light metal, such as aluminum or an aluminum alloy.

The pressure plate 29 is installed to the right, as seen in FIG. 1, of the drive plate 7 nearest to the clutch cover 28, where the pressure plate 29 is sandwiched between the spring 30 and the right-most drive plate 7. The pressure plate 29 has, on its outer periphery, radially extending projections 32 which engage the engagement grooves 23 in a manner such that they are free to slide axially but relative rotation is inhibited. An annular axially extending protrusion 33 with a semicircular cross-section is integrally provided on a portion of the back surface of the pressure plate 29 which contacts the spring 30.

As shown in FIG. 2, the diaphragm spring 30 is formed with an annular portion 30a and plural lever portions 30b which extend radially inward from the inner periphery of the annular portion 30a. The lever portions 30b are provided at equal intervals around the circumference, slits are formed between neighboring lever portions 30b, and a plurality of notches 30c whose width in the circumferential direction is comparatively large is defined at the outer end portion, going radially, of each slit.

Figure 3:
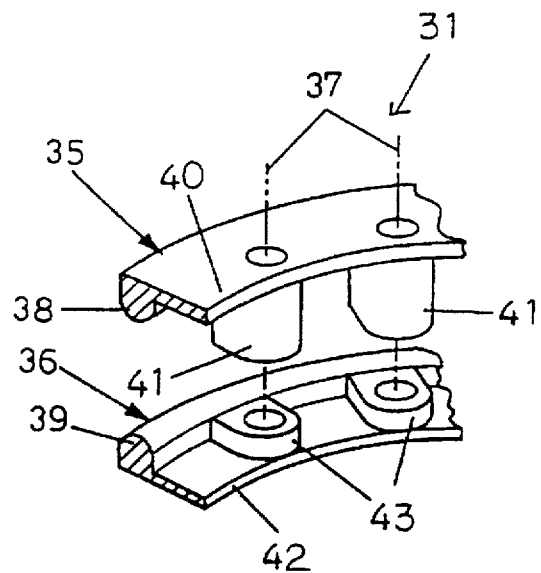
FIG. 3 is a fragmentary, part section, exploded perspective view of annular disk-like ring members employed in the dry multi-disk clutch depicted in FIG. 1.

The support structure 31 includes several elements, such as a first annular disk-like ring member 35 and a second annular disk-like ring member 36 shown in FIG. 3. The ring members 35 and 36 support the inner periphery portion of the annular portion 30a of the diaphragm spring 30 as shown in FIG. 1. A plural bolts 37 fix the annular disk-like ring members 35 and 36 to the clutch cover 28. Each of the plural bolts 37 extend through one of the notches 30c in the spring 36, as will be described further below.

The pair of annular disk-like ring members 35 and 36 are made of steel. The annular disk-like ring members 35 and 36 extend radially parallel to the diaphragm spring 30, and ring main bodies 38 and 39 are respectively provided on their outer peripheries. The portion of each of the ring main bodies 38 and 39 that contacts the diaphragm spring 30 has a cross-section with a protruding shape, such as that of a semicircle, etc. The ring main body 38 of the first annular disk-like ring member 35 contacts the diaphragm spring 30 from the clutch cover 2 side (the right side in FIG. 1), and the ring main body 39 of the second annular disk-like ring member 36 contacts the diaphragm spring 30 from the hub flange 6 side (the left side in FIG. 1). A thin, circularly extending seating portion 40 that is on the right-hand side in FIG. 1 is integrally formed on the inner periphery side of the ring main body 38. As can be seen in FIG. 3, the seating portion 40 has a radially extending, generally flat surface that is wider in an axial direction than the thickness of the ring main body 38. The seating portion 40 directly engages a corresponding recess portion formed in the clutch cover 28, the recess portion having a generally flat, radially extending surface.

Plural axially extending leg members 41 that are located at intervals around the circumference are formed integrally with the seating portion 40. A thin, circularly extending annular member 42 that is on the left-hand side in FIG. 1 is integrally formed on the inner periphery side of the ring main body 39. Plural axially extending projections 43 that are located at intervals around the circumference are formed integrally with the annular member 42. The projections 43 are also continuous with the inner periphery of the ring main body 39. The leg members 41 and projections 43 project in directions so that they approach one another, and, in the state shown in FIG. 1, the leg members 41 pass through the notches 30c of the diaphragm spring 30 and are seated on the projections 43.

In the inner-side end surface of the clutch cover 28, there is formed a notch in which the back surface and the inner peripheral surface and outer peripheral surface of the seating portion 40 of the first annular disk-like ring member 35 are seated. The annular disk-like ring member 35 is fixed by the bolts 37. In the first annular disk-like ring member 35, bolt insertion holes (unthreaded holes) through which the bolts 37 can be passed are formed in the leg members 41 and in the portions of the seating portion 40 that are a continuation thereof, and bolt insertion holes coaxial with these holes are also formed in the clutch cover 28. Threaded holes are formed in the projections 43 of the second annular disk-like ring member 36 and in the portions of the annular member 42 that are a continuation thereof, and the threaded portions of the bolts 37 are fixed in these threaded holes.

The annular disk-like ring members 35 and 36 are fixed to the clutch cover 28 by plural bolts 37 in the manner described above. Furthermore, the outer periphery portion of the annular portion 30a of the diaphragm spring 30 supported by the annular disk-like ring members 35 and 36 contacts the protrusion 33 of the pressure plate 29, and the diaphragm spring 30 urges the pressure plate 29 towards the flywheel 2 side (to the left in FIG. 1).

A release bearing 50 (shown in phantom in FIG. 1) is provided adjacent to the inner periphery portion of the diaphragm spring 30. When the release bearing 50 presses the tip-ends of the lever portions 30b of the diaphragm spring 30 towards the flywheel 2, the annular portion 30a of the diaphragm spring 30 moves away from the pressure plate 29, and as a result the clutch coupling is disengaged.

In the above structure, the hub flange 6 is free to slide axially relative to the transmission input shaft 3, and it is therefore necessary to maintain the position the hub flange 6 in the axial direction relative to the plates 7 and 8. For this purpose, a radially extending positioning pin 51 is mounted on the second drum-shaped element 13 of the hub flange 6, as shown in FIG. 1. The positioning pin 51 is, for instance, a roll pin formed from a sheet of material, such as steel, that is rolled into a pin shape having a slit is formed longitudinally. A radially extending fitting hole 52 is formed in a portion of the second drum-shaped element 13 that extends through the flange 12, and the positioning pin 51 is fixed, in a compressed state, in this fitting hole 52. The intermediate portion of the positioning pin 51 in the direction of its length is fitted in the fitting hole 52, and just an end portion of the pin 51 extends into one engagement groove 18. Further, the pin 51 extends between adjacent projections 27 of two driven plates 8.

The flywheel 2 and pressure plate 29 restrict the range of axial displacement of the drive plates 7 and driven plates 8. As a result of the positioning pin 51 being located between the projections 27 of two driven plates 8, restricts axial movement of the hub flange 6.

Next, operation will be described. When the clutch is in a coupled state, the release bearing 50 does not press the diaphragm spring 30 towards the flywheel 2, and the diaphragm spring 30, by its own resilient force, presses the pressure plate 29 against the friction disk group 9. Consequently, the drive plates 7 and driven plates 8 are brought into pressure contact with one another, and torque that is input from the flywheel 2 to the flywheel ring 5 is transmitted via the drive plates 7 and driven plates 8 to the hub flange 6, and is output by the hub flange 6 to the transmission input shaft 3.

To disengage the clutch, the release bearing 50 presses the tip-ends of the lever portions 30b of the diaphragm spring 30 towards the flywheel 2, so displacing the annular portion 30a outer periphery portion of the diaphragm spring 30 in a direction so that it moves away from the pressure plate 29. As a result, the drive plate 7 and driven plate 8 pressure contact force is removed and the clutch is disengaged.

In the above operation the diaphragm spring 30 deforms while in a state in which it is supported by the annular disk-like ring members 35 and 36, and as a result of this deformation, the annular disk-like ring members 35 and 36 try to move relative to the clutch cover 28. However, the seating portion 40 of the first annular disk-like ring member 35 is in contact with the clutch cover 28. In other words, the area of the first annular disk-like ring member 35 surface that is seated against the clutch cover 28 is greater than it is conventionally, and its surface pressure is therefore smaller. As a result, wear of the clutch cover 28 caused by contact with members similar to the annular disk-like ring member 35 is effectively prevented, even if, as in a conventional structure, the annular disk-like ring members 35 and 36 are made of steel, and the clutch cover 28 is made of a material constituted mainly by aluminum.

Furthermore, thanks to the fact that a notch, in which the back surface and the inner peripheral surface and outer peripheral surface of the seating portion 40 of the first annular disk-like ring member 35 are seated, is provided in the inner-side end surface of the clutch cover 28, it is difficult for the first annular disk-like ring member 35 to slide relative to the clutch cover 28. Furthermore, wear of the clutch cover 28 is reduced still more, since it is not in contact with the second annular disk-like ring member 36.

Also, although the first annular disk-like ring member 35 may act to perform relative displacement, it is difficult for wear to occur, since they are usually both made of steel.

Although, in the above described clutch coupling and uncoupling operations, heat due to friction is produced in the drive plates 7 and driven plates 8, an abnormal temperature rise in these elements is prevented, since they are effectively cooled by air in the manner described below.

Low-temperature air flows from the space 58 outside the clutch into the internal space 56 that is between the flange 12 and the diaphragm spring 30. A portion of this air flows into the internal space 57 via the air passage openings 14. Under the action of centrifugal force, etc., the air inside the internal spaces 56 and 57 goes through the air passage holes 19 and 20 to flow into the engagement grooves 18 and, going along the surfaces of the drive plates 7 and driven plates 8, it flows from the engagement grooves 18 as far as the engagement grooves 23, and while it does so, the drive plates 7 and driven plates 8 are cooled. The air goes through the air passage grooves 24 to flow out from the engagement grooves 23 to outside the flywheel ring 5. As a result, satisfactory and generally uniform cooling of all the drive plates 7 and driven plates 8 is effected. It is further noted that, since the grooves 8a formed in the driven plates 8 are on straight lines with air passage holes 19 and 20 in radial directions, the flow of air is smooth, and consequently the drive plates 7 and driven plates 8 are cooled more effectively.

Also, although dust caused by wear is produced on the surfaces of the drive plates 7 and driven plates 8, this dust too flows from the engagement grooves 23 to outside the flywheel ring 5 via the air passage grooves 24. In particular, since the air passage grooves 24 are formed extending in the circumferential direction, their opening area is large, so increasing the plate 7 and 8 cooling and wear dust discharge effects.

In the structure described above, the positioning pin 51 is mounted on the hub flange 6, and only the end portion of this positioning pin 51 lies in an engagement groove 18, while its remaining portion is located inwardly from the engagement groove 18 in the radial direction. Therefore, the positioning pin 51 provides generally little or no increase in the moment of inertia of the hub flange 6 as compared to prior art positioning means where are larger, more substantial mass forms a positioned means within a clutch mechanism. The reduction of the moment of inertia of the hub flange 6 improves the response of the clutch to engagement and disengagement actions.

Figure 5:
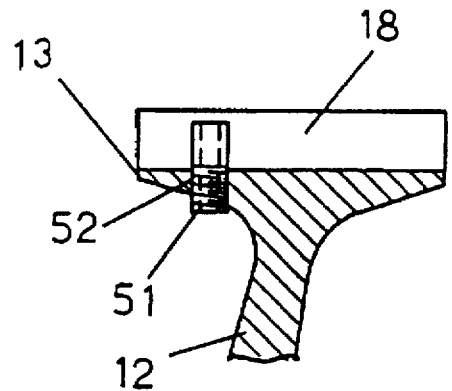
FIG. 5 is a fragmentary, part cross-section of a portion of the dry multi-disk clutch depicted in FIG. 1, showing a positioning pin.

In a slight modification shown in FIG. 5, the positioning pin 51 may be composed of, for instance, a hollow bolt, whose threaded portion fits in a threaded hole (fitting hole 52) of the second drum-shaped element 13, and whose unthreaded portion lies in an engagement groove 18.

Figure 6:
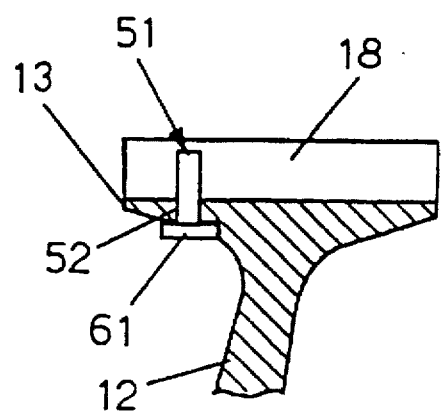
FIG. 6 is a fragmentary, part cross-section similar to FIG. 5, showing an alternate configuration of the positioning pin.

In yet another modification shown in FIG. 6, the positioning pin 51 is press-fitted in the fitting hole 52, and at one end thereof there is a large-diameter flange 61 which engages the inner peripheral surface of the second drum-shaped element 13, so preventing the positioning pin 51 from going radially outward and becoming detached as a result of centrifugal force.

Advantages of the Invention

In the clutch thrust assembly according to the invention, since the seating portion of the first ring element is seated on the clutch cover, the area of contact between the first ring element and the clutch cover is greater than it is conventionally. As a result, the surface pressure at the contact portion is smaller, and so wear of the clutch cover caused by the ring element is suppressed.

When the seating portion of the first ring element is annular and extends radially from the first ring main body, the first ring element and clutch cover contact area is larger than it is conventionally, and as a result clutch cover wear caused by the ring element is suppressed. When the clutch cover has a recess portion for the purpose of seating the seating portion, clutch cover wear caused by the first ring element is suppressed, since movement of this ring element is restricted. When the projection portions of the first ring element are seated in the support portions of the second ring element, clutch cover wear caused by the second ring element is suppressed, since this ring element is not in contact with the clutch cover.

Figure 7:
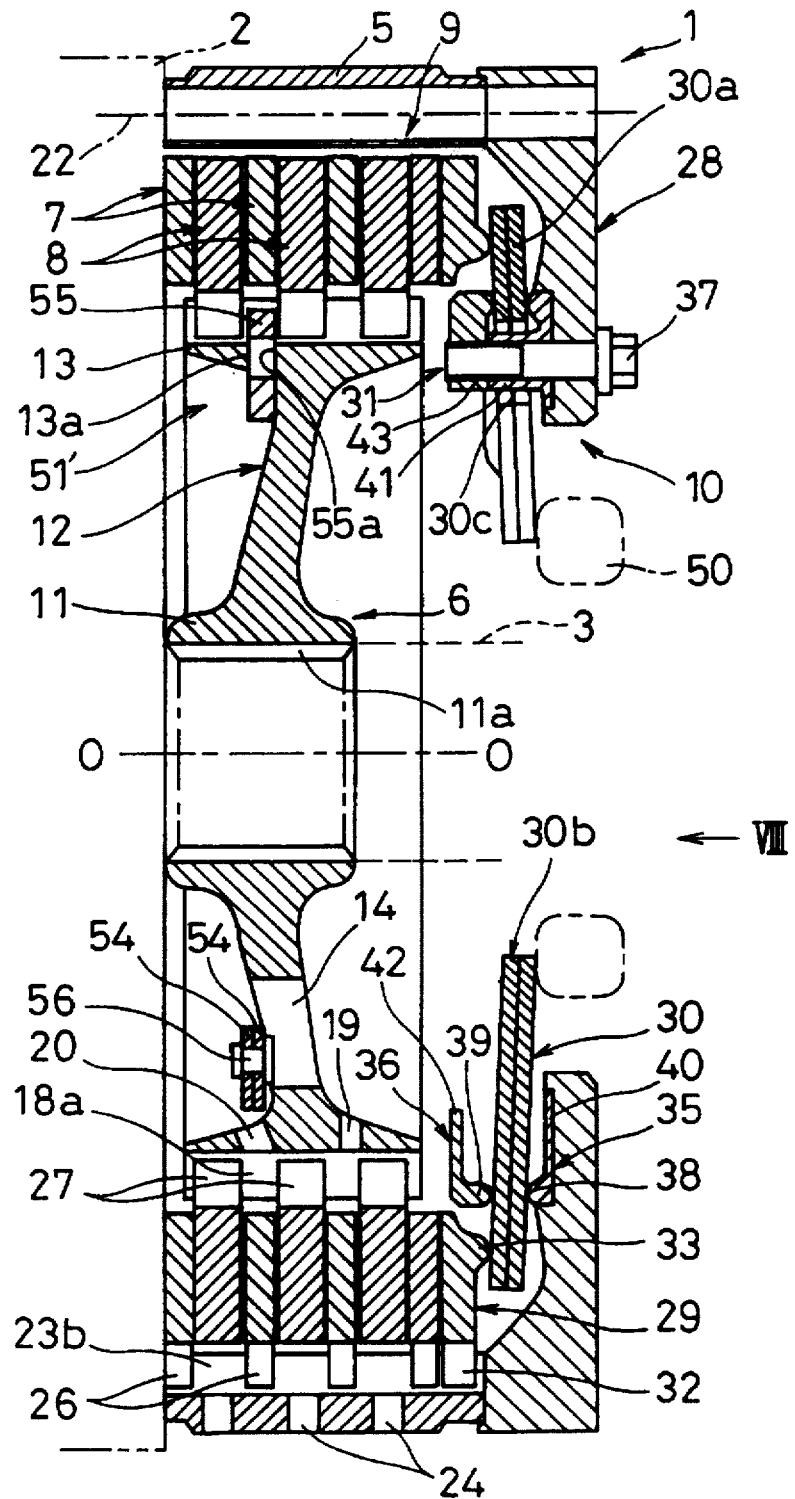
FIG. 7 is a cross-sectional view similar to FIG. 1, of a dry multi-disk clutch in accordance with a second embodiment of the present invention.
Figure 8:
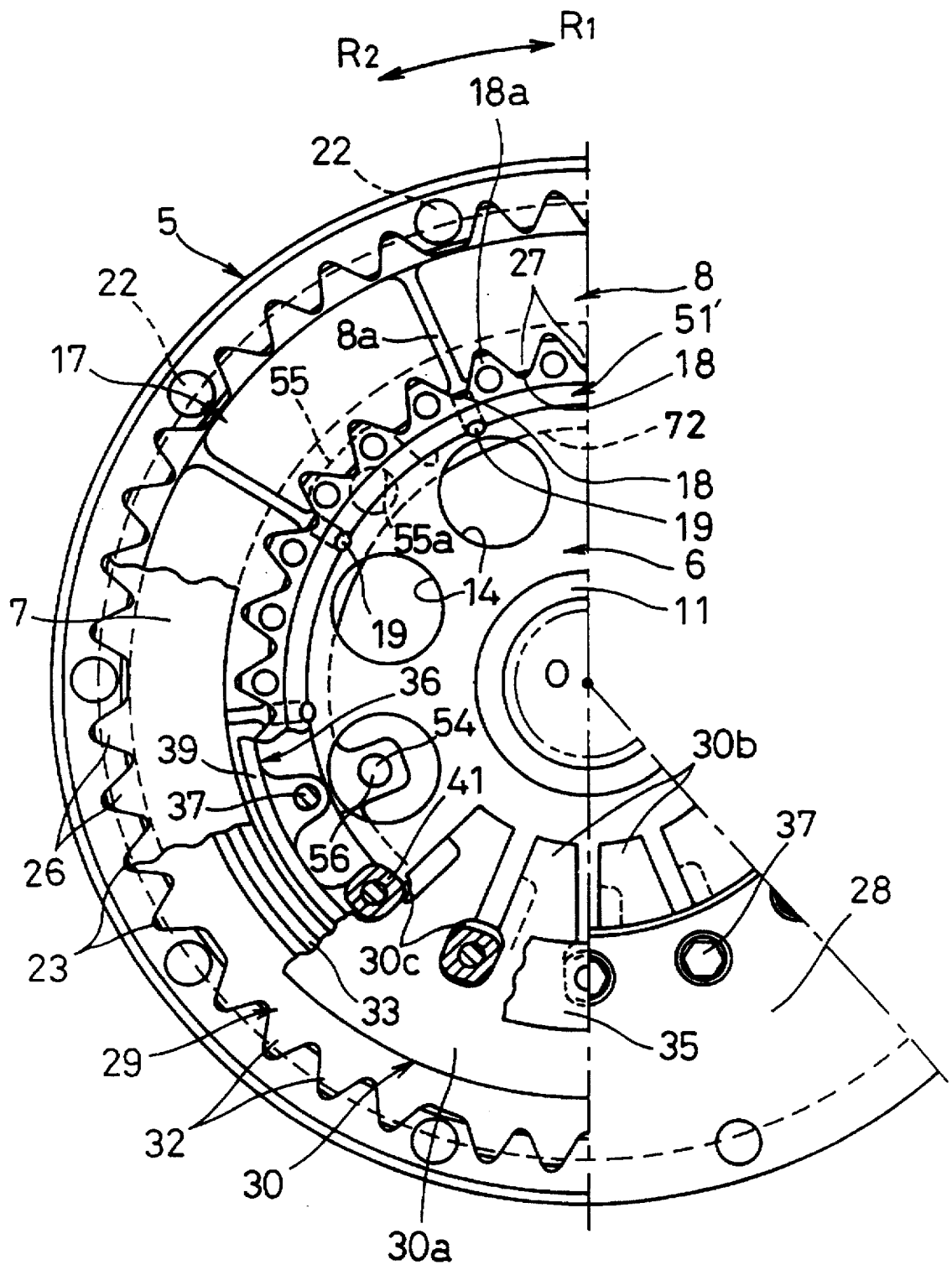
FIG. 8 is a fragmentary, part cut-away view of a portion of the dry multi-disk clutch depicted in FIG. 7, looking in the direction of the arrow VIII in FIG. 7.
Figure 9:
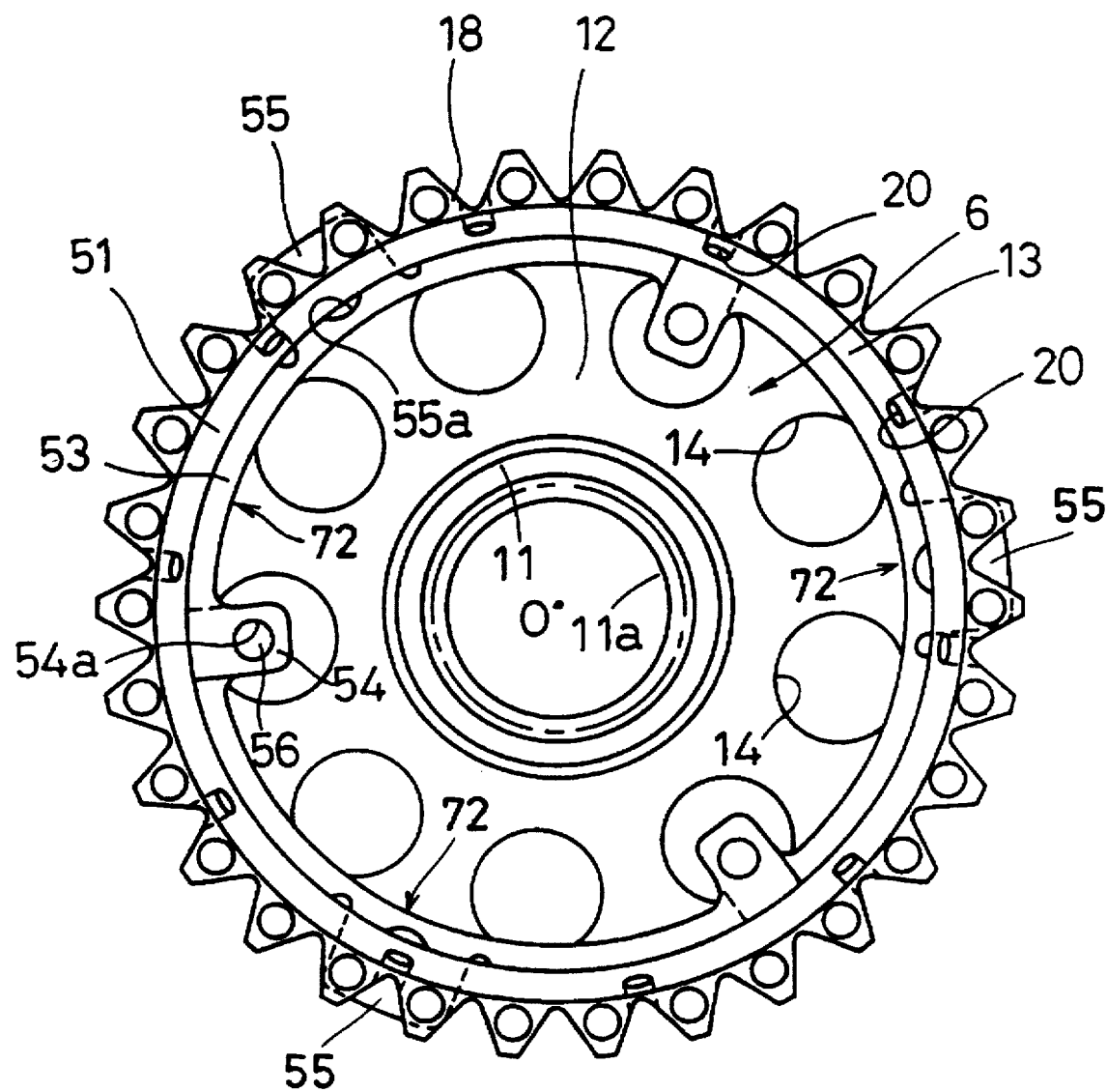
FIG. 9 is an elevation of a hub flange and locating plate employed in the second embodiment depicted in FIGS. 7 and 8, shown removed from the multi-disk clutch.
Figure 10:
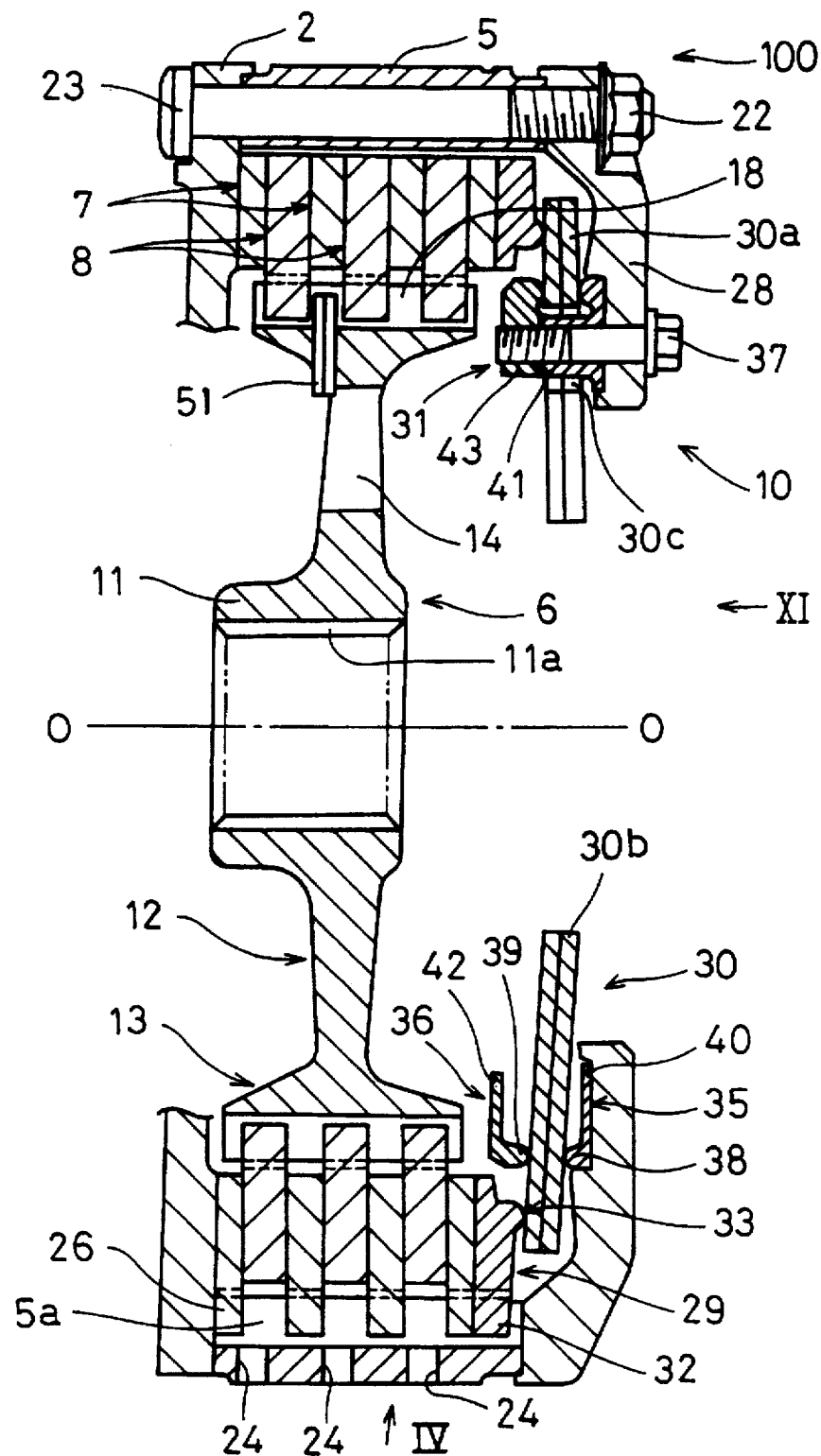
FIG. 10 a cross-sectional view, similar to FIG. 1, showing a dry multi-disk clutch in accordance with a third embodiment of the present invention.
Figure 11:
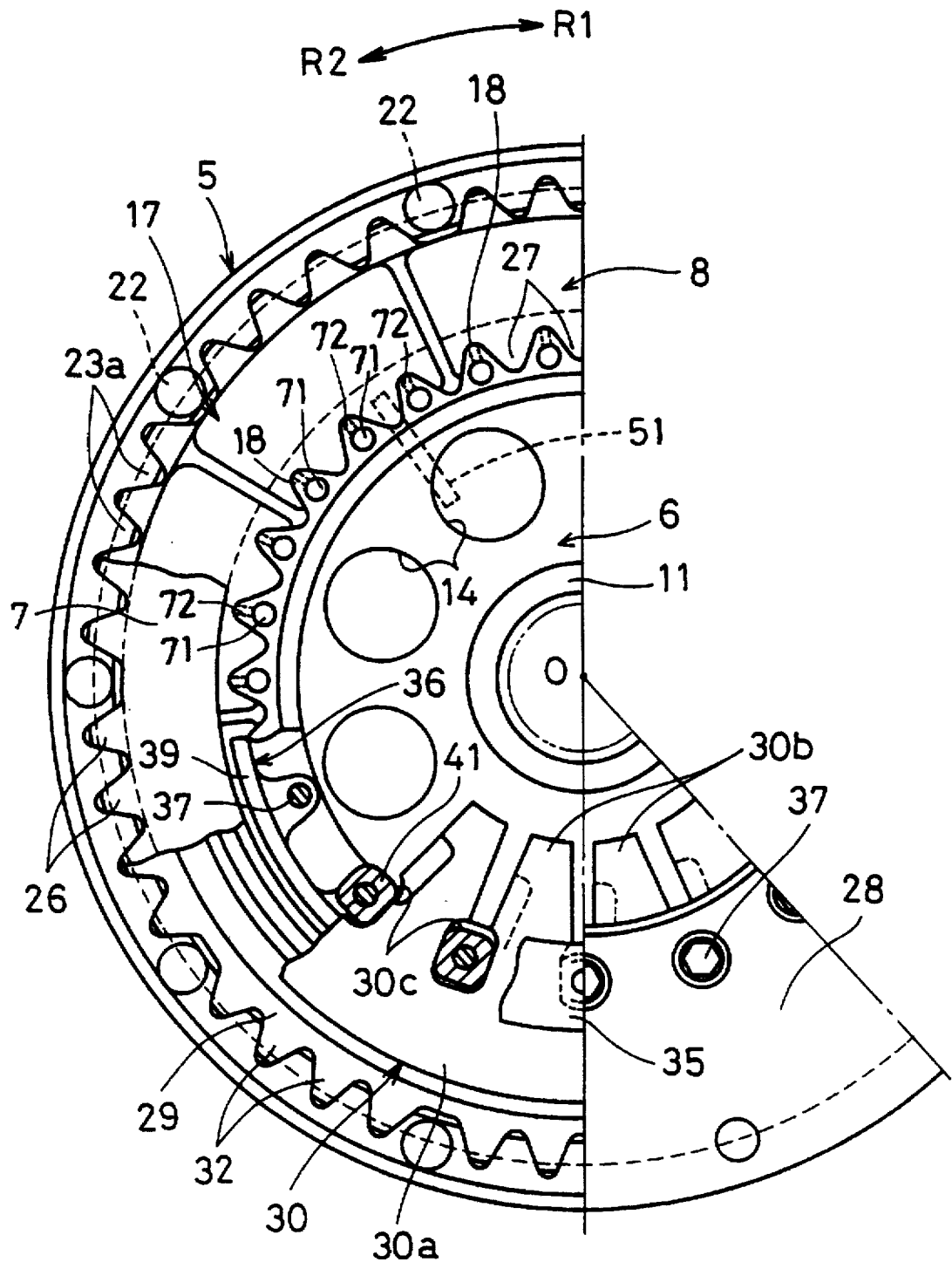
FIG. 11 is a fragmentary, part elevational, part cut-away view of the dry multi-disk clutch depicted in FIG. 10, looking in the direction of the arrow XI in FIG. 10.

In a second embodiment of the present invention, depicted in FIGS. 7, 8 and 9, many of the elements described above with respect to FIGS. 1 through 4 are present. For instance, the clutch assembly 1 in FIGS. 7, 8 and 9 includes a hub flange 6, a flywheel ring 5, and many other elements similar or identical to elements in the first embodiment. Such elements in the second embodiment are given reference numerals that are consistent with the reference numerals used with respect to FIGS. 1 through 4.

In the second embodiment depicted in FIGS. 7, 8 and 9, the hub flange 6 is free to move axially relative to the transmission input shaft 3, and it is therefore necessary to restrict axial displacement of the hub flange 6. For this purpose, an annular locating plate 51' is mounted on the second drum-shaped element 13 of the hub flange 6, as shown in FIGS. 7, 8, and 9. The locating plate 51' includes three arcuate plates 72. Each arcuate plate 72 has a ring segment 53, two connection pieces 54, one connection piece 54 at each end of each ring segment 53 and which extend radially inward from the ring segment 53, and a contact piece 55 which projects radially outward from the ring segment 53. Holes 54a are formed in the connection pieces 54, and the connection pieces 54 are fixed by inserting rivets 56 in their respective holes 54a such that the three arcuate plates 72 are fixed to one another to form a single annular ring-like structure.

The connection pieces 54 and rivets 56 are located facing air passage openings 14 of the flange 12. The contact pieces 55 are thicker than the other portions of the arcuate plates 72, and they have a predetermined width going circumferentially. Circular holes 55a are formed in the contact pieces 55 and extend axially therethrough.

As described above, the locating plate 51' has three contact pieces 55, one contact piece formed on each arcuate plate 72. Due to the repetitive shape of the three arcuate plates 72 which are fixed together to form a single ring-like structure, the contact pieces spaced apart at equal intervals going circumferentially. Three arcuate slits 13a are formed in spaced apart locations going circumferentially in a portion of the second drum-shaped element 13, the slits 13a extending radially through the second drum-shaped element 13. The contact pieces 55 are disposed to extend through the slits 13a so that their tip-end portions enter into engagement grooves 18 and are positioned between the projections 27 of pairs of driven plates 8 in the axial direction.

The above-described flywheel 2 and pressure plate 29 limit the range of axial displacement of the drive plates 7 and driven plates 8. The position, going in the axial direction, of the hub flange 6 is maintained within a set range as the result of the contact pieces 55 of the locating plate 51' being positioned between the projections 27 of pairs of the driven plates 8 whose locations in the axial direction are thus restricted.

In the above structure, the locating plate 51' is mounted on the hub flange 6, and since it is in the shape of a ring, it is not liable to become detached.

Further, since the locating plate 51' has ring sections 53 provided on the inner periphery side of the second drum-shaped element 13 and only the contact pieces 55 are located more radially outward than the second drum-shaped element 13, the locating plate 51' acts to suppress an increase in the moment of inertia of the hub flange 6. An increase in the moment of inertia of the hub flange 6 is also suppressed by the locating plate 51' because of the holes 55a formed in the contact pieces 55. The holes 55a reduce the overall mass of the contact pieces 55. Thanks to the fact that the moment of inertia of the hub flange 6 is small, the clutch is more responsive to engagement and disengagement control actions.

Since three contact pieces 55 of the locating plate 51' are provided at equal intervals going circumferentially, the force imposed by the driven plates 8 on the locating plate 51' is uniformly dispersed, and as a result the durability of the contact pieces 55 of the locating plate 51' is improved.

The procedure for mounting the locating plate 51' on the hub flange 6 will now be described. First, the arcuate elements 72 are set on the inner periphery side of the second drum-shaped element 13, and each contact piece 55 is inserted through the interior of a slit 13a and its tip end is positioned in an engagement groove 18. Then, all the connection pieces 54 of the arcuate elements 72 are fixed by rivets 56. Since the locating plate 51' is thus constituted by plural arcuate plates 72, it is easy to assemble it together with the hub flange 6. Its disassembly, too, is easy. In particular, in the process of fitting the rivets 56, the mounting work is made still easier, since the connection pieces 54 and rivets 56 are located facing air passage openings 14 of the flange 12. Also, disassembly, too, is made easier.

Although in the example described above, three locating plate contact pieces were provided around the circumference, a number greater than this may be provided.

In the multi-disk clutch according to the invention, the movement of second annular friction disks and first annular friction disks in the axial direction is restricted, since in the axial direction they lie between the rotating flywheel and loading mechanism. Therefore, axial displacement of the output element can be restricted by bringing the axial displacement restriction element mounted on the output element axially into contact with second tooth portions of the second annular friction disks. Since the axial displacement restriction element is in the shape of a ring, it is not liable to become detached from the second drum-shaped element.

Since the annular element of the axial displacement restriction element is installed on the inner periphery side of the second drum-shaped element, it is possible to suppress an increase in the overall moment of inertia.

When plural projections are formed in correspondence to cutouts, force imposed by the second annular friction disks is dispersed, since the number of locations where there is contact with the second tooth portions of the second drum-shaped element is increased, and as a result the durability of the projections is improved.

When the annular element is constituted by arcuate elements, it is easy to assemble the axial displacement restriction element with the second drum-shaped element and to remove it.

When three or more projections are formed, the force imposed by the second annular friction disks is dispersed, since there are more locations where contact is established with the second tooth portions of the second annular friction disks, and as a result the durability of the projections is improved.

A third embodiment of the present invention is depicted in FIGS. 10, 11, 12 and 13. In the third embodiment, a dry multi-disk clutch 100 includes many of the features described above, such as the flywheel ring 5, the hub flange 6, the drive plates 7, the driven plates 8 and the clutch cover 10. Further, the second cylindric drum-shaped 13 is formed on the hub flange 6 as previously described with respect to the first two embodiments.

The second cylindric drum-shaped element 13 is formed with a plurality of the outer teeth 18. The outer teeth 18 extend in the axial direction at an outer radial portion of the second cylindrical drum-shaped element 13. As shown in FIGS. 2, 8 and 9, but not described with respect to the first two embodiments, the outer teeth 18 are formed with axial holes 71 extending in an axial direction and open to both axial end surfaces of the outer teeth 18. The mass of the hub flange 6 is decreased by the axial holes 71. However, in the third embodiment shown in FIGS. 11–13, the outer teeth 18 are also formed a plurality of air passage holes 72, each hole 72 extending from the axial hole 71 radially outward and open to the outer axial end of the corresponding outer tooth 18. The air passage holes 72 are formed at positions which generally correspond to the axial positions the intermediate drive plates 7, as is shown in FIG. 12.

Figure 12:
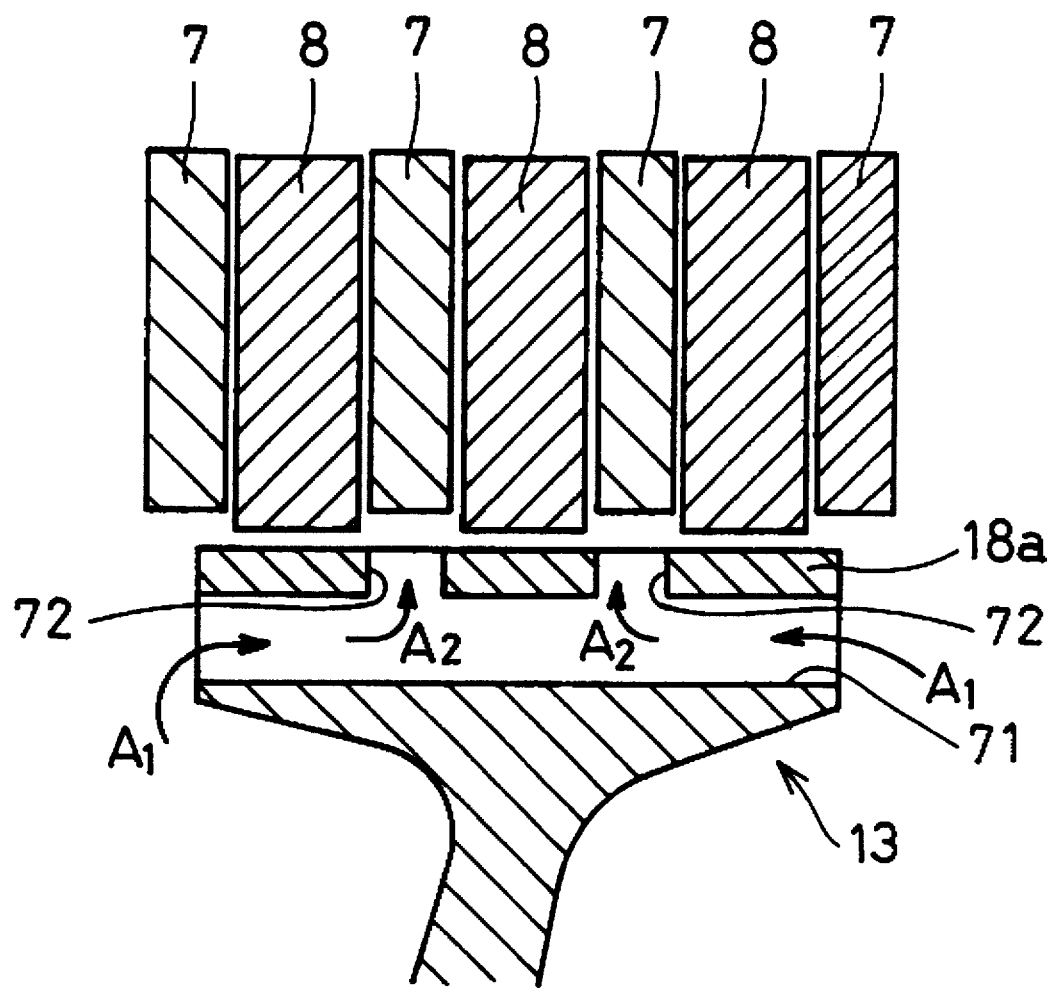
FIG. 12 is a fragmentary, cross-sectional view of a portion of the dry multi-disk clutch depicted in FIG. 10 on a slightly enlarged scale.
Figure 13:
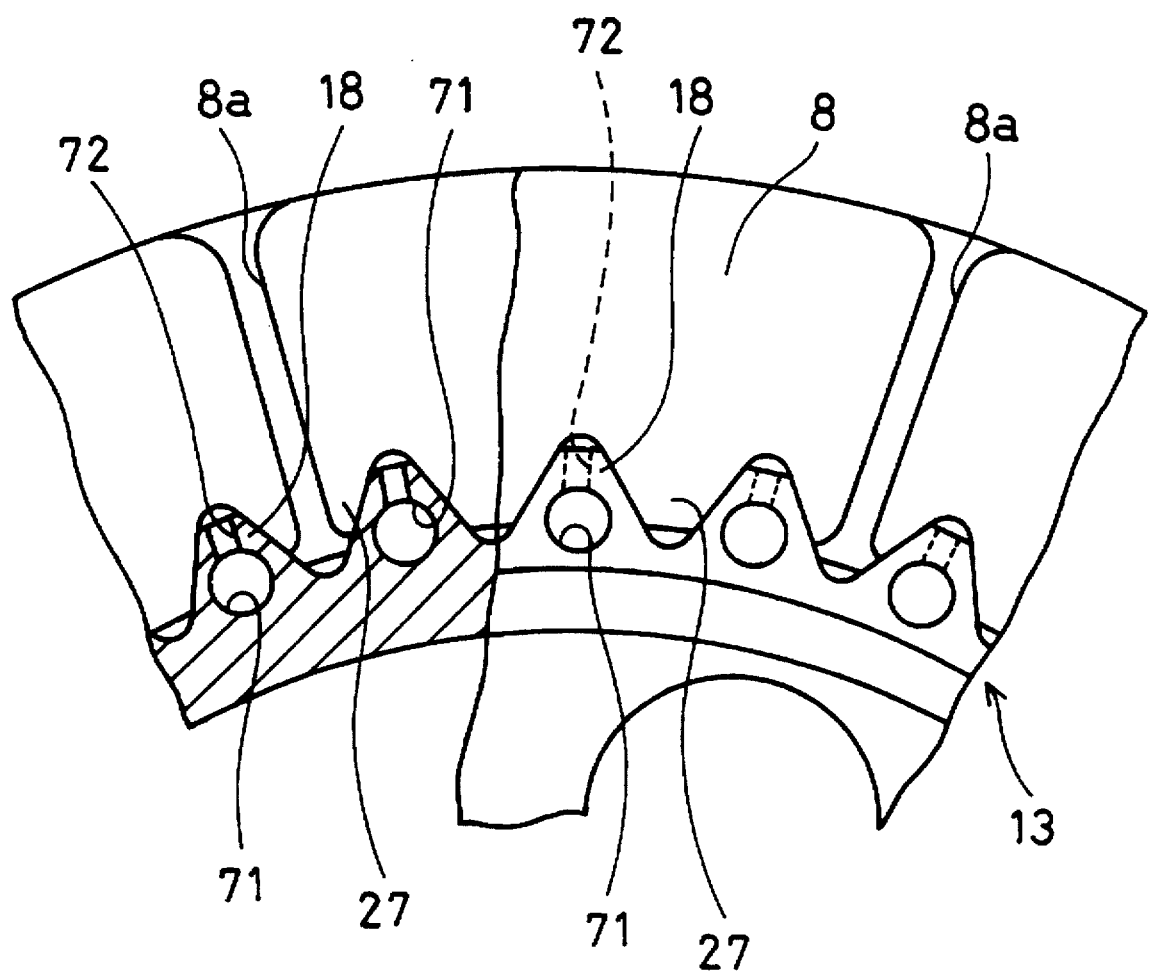
FIG. 13 is a fragmentary, cross-sectional view of a portion of FIG. 11, on a slightly enlarged scale, showing air flow holes formed in a portion of the dry multi-disk clutch.

Air is able to flow into the axial holes 71 from each of the axial end surfaces of the outer teeth 18 such that as the dry multi-disk clutch 100 rotates, as indicated in FIG. 12 by the arrows $A_1$. The centrifugal forces force the air out of the holes 72 at a generally high rate, as is shown in FIG. 12 by the arrows $A_2$, thus providing a means of dissipating heat in a manner more efficient than in prior art configurations. The flow of air is directed to a space radially inward of the drive plates 7, i.e. between radially inward portions of the driven plates 8. The air is then able to flow through the grooves 8a formed on the driven plates 8 radially outward (see FIG. 13). The air cools the drive plates 7 and the driven plates 8. The air moves through the air passage grooves 24 radially outward of the flywheel ring 5 (see FIG. 10).

Figure 14:
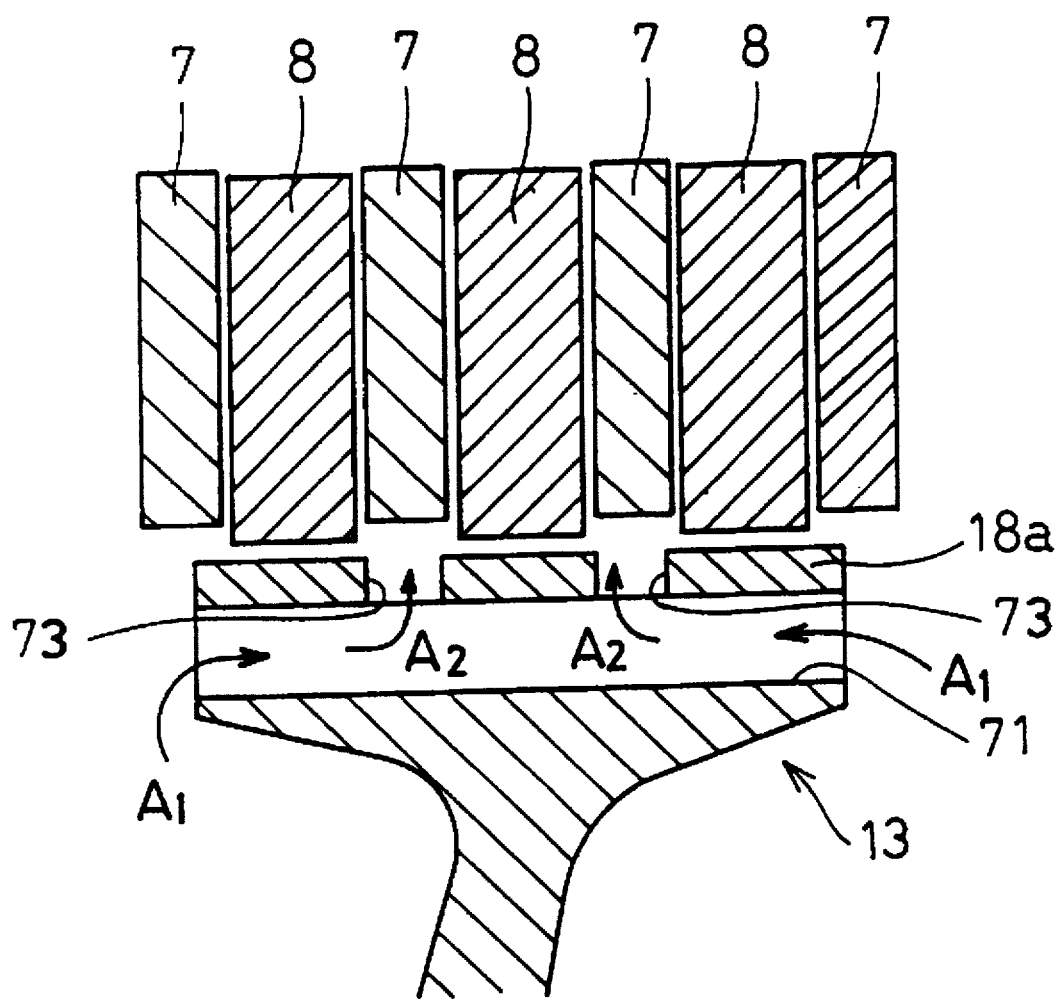
FIG. 14 is similar to FIG. 12, but shows a fourth embodiment of the dry multi-disk clutch.
Figure 15:
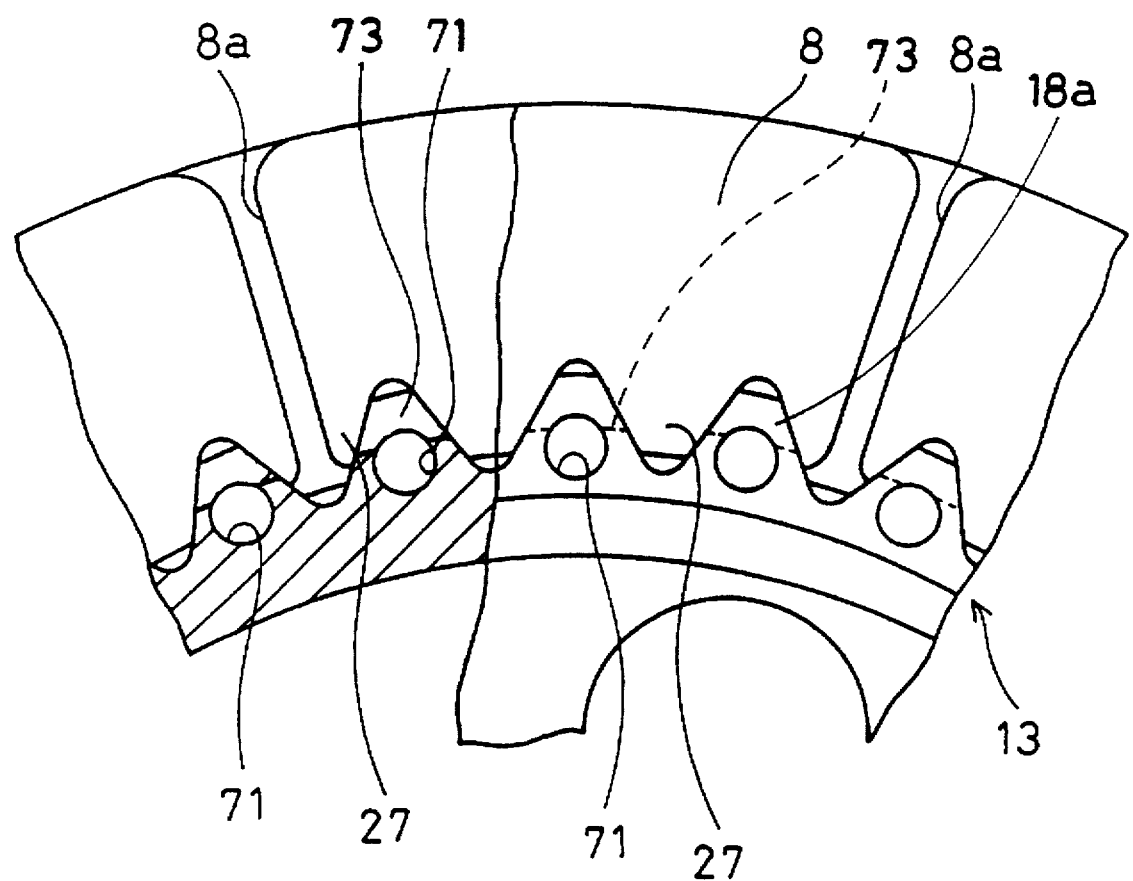
FIG. 15 is similar to FIG. 13, but shows a fragmentary, cross-sectional view of the fourth embodiment of the present invention of the dry multi-disk clutch depicted in FIG. 14.

A fourth embodiment of the present invention is depicted in FIGS. 14 and 15. As shown in FIGS. 14 and 15, two circumferentially extending grooves 73 are formed on the outer teeth 18 instead of the air passage holes 72 described with respect to the third embodiment above. In the fourth embodiment, the bottoms of the grooves 73 extend to the axial holes 71. In other words, the axial holes 71 are open the outer radial surface of the outer teeth 18a via the grooves 73. The advantages to this configuration are similar to that described above with respect to the third embodiment. In particular, the heat dissipation is improved by the configuration of the grooves 73 and the holes 71.

Figure 16:
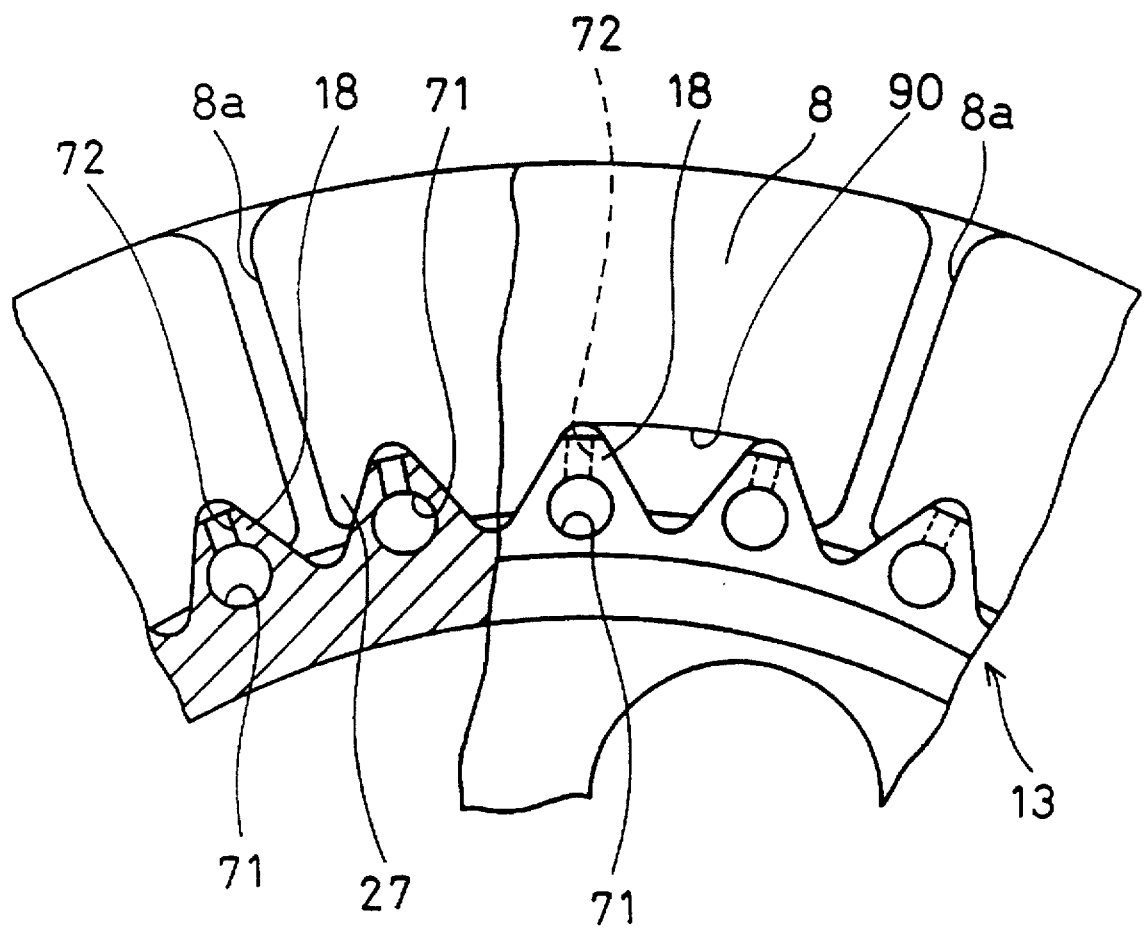
FIG. 16 is similar to FIG. 15, but shows a fifth embodiment of the present invention.

A fifth embodiment of the present invention is shown in FIG. 16. To further improve the flow of air through the holes 71 and holes 72 described above with respect to the third embodiment and FIGS. 10–13, at least some of the projections 27 of the driven plates 8 are removed and gaps 90 are formed in their place. The gaps 90 permit an increased flow of air axially in the radially inward portion of the plates 7 and 8 so that the plates 7 and 8 are cooled more effectively. The positioning of the gaps 90 depends upon the desired increase in air flow. For instance, only one gap 90 is shown FIG. 9, but two or more gaps 90 may be formed in the driven plates 8.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A clutch assembly comprising:

a hub member having a central hub which is connectable to a transmission shaft, said hub member also having a drum-shaped element and a flange portion which extends radially outward from said central hub to said drum-shaped element, said drum-shaped element formed with a plurality of gear teeth, and a plurality of axially extending holes, each one of said axially extending holes extending through a corresponding one of said gear teeth and each of said gear teeth formed with a radially extending opening extending from said axially extending hole to a radial outward portion of said corresponding one of said gear teeth.

2. The clutch assembly as set forth in claim 1, wherein said radially extending opening is a hole extending from said radially outward portion of said gear teeth to said axially extending hole.

3. The clutch assembly as set forth in claim 1, wherein said radially extending opening is a circumferentially extending groove formed in said gear teeth and open to said axially extending hole.

4. The clutch assembly as set forth in claim 1, further comprising:

an outer cylindric drum-shaped element connectable to a flywheel, said outer cylindric drum-shaped element formed with a plurality of elongated air passages which extend in a circumferential direction on an outer surface thereof, said hub member disposed within said outer cylindric drum-shaped element, a plurality of clutch drive plates and a plurality of clutch driven plates disposed in axially alternating layers between said outer cylindric drum-shaped element and said drum-shaped element, said clutch drive plates having outer periphery portions contacting an inner peripheral surface of said outer cylindric drum-shaped element for rotation therewith, and for axial movement relative thereto, inner periphery portions of said clutch driven plates contacting an outer peripheral surface of said drum-shaped element for rotation therewith, and for relative axial movement with respect thereto, said clutch driven plates formed with radially extending grooves which allow for passage of air, and a clutch cover mechanism for selective engagement and dis-engagement of said clutch drive plates with said clutch driven plate.

5. The clutch assembly as set forth in claim 4, wherein said clutch driven plates are formed with gaps proximate said radially extending openings.

6. A clutch assembly comprising:

a first cylindric drum-shaped element connectable to a flywheel;

a hub member having a central hub which is connectable to a transmission shaft, said hub member formed with a second drum-shaped element and a flange portion which extends radially outward from said central hub to said second drum-shaped element, said hub member disposed within said first cylindric drum-shaped element, said second drum shaped element formed with a plurality of gear teeth, each of said gear teeth being formed with a separate axially extending hole extending therethrough and each of said gear teeth further formed with a radially extending opening extending from said axially extending hole to a radial outward portion of said gear teeth;

a plurality of clutch drive plates and a plurality of clutch driven plates disposed in axially alternating layers between said first cylindric drum-shaped element and said second drum-shaped element, said clutch drive plates having outer periphery portions contacting an inner peripheral surface of said first cylindric drum-shaped element for rotation therewith, and for axial movement relative thereto, inner periphery portions of said clutch driven plates contacting an outer peripheral surface of said second drum-shaped element for rotation therewith, and for relative axial movement with respect thereto, and a clutch cover mechanism for selective engagement and dis-engagement of said clutch drive plates with said clutch driven plates.

7. The clutch assembly as set forth in claim 6, wherein said radially extending opening is a hole extending from said radially outward portion of said said gear teeth to said axially extending hole.

8. The clutch assembly as set forth in claim 6, wherein said radially extending opening is a circumferentially extending groove formed in said said gear teeth and open to said axially extending hole.

9. The clutch assembly as in claim 6, wherein said first cylindric drum-shaped element being formed with radially extending air passages which provide communication between inside and outside the first cylindric drum-shaped element.

10. The clutch assembly as in claim 9, wherein said air passages are elongated slits extending in the circumferential direction.

11. The clutch assembly as in claim 10 wherein said drive plates and said driven plates are formed with radially extending grooves on one surface thereof.

12. The clutch assembly as in claim 6 wherein said hub member, said second drum shaped element and said flange portion are integrally formed.

13. The clutch assembly as in claim 6, wherein said flange portion being formed with air passage openings.

14. A clutch assembly comprising:

a hub member having a central hub which is connectable to a transmission shaft, said hub member also having a drum-shaped element and a flange portion which extends radially outward from said central hub to said drum-shaped element, said drum-shaped element formed with a plurality of gear teeth, at least one of said gear teeth having an axially extending hole extending therethrough and a radially extending opening extending from said axially extending hole to a radial outward portion of said one of said gear teeth;

wherein said radially extending opening is a circumferentially extending groove formed in said one of said gear teeth and open to said axially extending hole.

15. The clutch assembly as set forth in claim 14, wherein each of said gear teeth are formed with separate one of said axially extending hole and said radially extending opening.

16. The clutch assembly as set forth in claim 14, further comprising:

an outer cylindric drum-shaped element connectable to a flywheel, said outer cylindric drum-shaped element formed with a plurality of elongated air passages which extend in a circumferential direction on an outer surface thereof, said hub member disposed within said outer cylindric drum-shaped element, a plurality of clutch drive plates and a plurality of clutch driven plates disposed in axially alternating layers between said outer cylindric drum-shaped element and said drum-shaped element, said clutch drive plates having outer periphery portions contacting an inner peripheral surface of said outer cylindric drum-shaped element for rotation therewith, and for axial movement relative thereto, inner periphery portions of said clutch driven plates contacting an outer peripheral surface of said drum-shaped element for rotation therewith, and for relative axial movement with respect thereto, said clutch driven plates formed with radially extending grooves which allow for passage of air, and a clutch cover mechanism for selective engagement and dis-engagement of said clutch drive plates with said clutch driven plate.

17. The clutch assembly as set forth in claim 16, wherein said clutch driven plates are formed with gaps proximate said radially extending openings.

18. A clutch assembly comprising:

a first cylindric drum-shaped element connectable to a flywheel;

a hub member having a central hub which is connectable to a transmission shaft, said hub member formed with a second drum-shaped element and a flange portion which extends radially outward from said central hub to said second drum-shaped element, said hub member disposed within said first cylindric drum-shaped element, said second drum shaped element formed with a plurality of gear teeth, at least one of said gear teeth having axially extending hole extending therethrough and a radially extending opening extending from said axially extending hole to a radial outward portion of said one of said gear teeth;

a plurality of clutch drive plates and a plurality of clutch driven plates disposed in axially alternating layers between said first cylindric drum-shaped element and said second drum-shaped element, said clutch drive plates having outer periphery portions contacting an inner peripheral surface of said first cylindric drum-shaped element for rotation therewith, and for axial movement relative thereto, inner periphery portions of said clutch driven plates contacting an outer peripheral surface of said second drum-shaped element for rotation therewith, and for relative axial movement with respect thereto;

a clutch cover mechanism for selective engagement and dis-engagement of said clutch drive plates with said clutch driven plates; and wherein said radially extending opening is a circumferentially extending groove formed in said one of said gear teeth and open to said axially extending hole.

19. The clutch assembly as set forth in claim 18, wherein each of said gear teeth are formed with a separate one of said axially extending hole and said radially extending opening.

20. The clutch assembly as in claim 18, wherein said first cylindric drum-shaped element being formed with radially extending air passages which provide communication between inside and outside the first cylindric drum-shaped element.

21. The clutch assembly as in claim 20, wherein said air passages are elongated slits extending in the circumferential direction.

22. The clutch assembly as in claim 21 wherein said drive plates and said driven plates are formed with radially extending grooves on one surface thereof.

23. The clutch assembly as in claim 18 wherein said hub member, said second drum shaped element and said flange portion are integrally formed.

24. The clutch assembly as in claim 6, wherein said flange portion being formed with air passage openings.

* * * * *